US012601073B2

(12) United States Patent
Carlson et al.

(10) Patent No.: US 12,601,073 B2
(45) Date of Patent: Apr. 14, 2026

(54) H2 DRYER FOR POWER PLANT USING ELECTROLYZER

(71) Applicant: Mitsubishi Power Americas, Inc., Lake Mary, FL (US)

(72) Inventors: Todd Eric Carlson, Lake Mary, FL (US); Leif Hsieh, Sanford, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 771 days.

(21) Appl. No.: 17/895,560

(22) Filed: Aug. 25, 2022

(65) Prior Publication Data

US 2024/0068117 A1     Feb. 29, 2024

(51) Int. Cl.
| | |
|---|---|
| *B01D 53/26* | (2006.01) |
| *B01D 53/04* | (2006.01) |
| *C25B 1/04* | (2021.01) |
| *C25B 15/02* | (2021.01) |

(52) U.S. Cl.
CPC ............ *C25B 15/02* (2013.01); *B01D 53/261* (2013.01); *C25B 1/04* (2013.01)

(58) Field of Classification Search
CPC ........ B01D 53/04; B01D 53/261; C25B 1/04; C25B 15/02
USPC ................ 95/19, 22, 117; 96/109, 113, 121; 423/644, 648.1, 657
See application file for complete search history.

(56) References Cited

U.S. PATENT DOCUMENTS

| | | |
|---|---|---|
| 4,119,417 A | 10/1978 | Heki et al. |
| 5,226,932 A | 7/1993 | Prasad |

| | | |
|---|---|---|
| 6,197,090 B1 | 3/2001 | Yamashita et al. |
| 6,572,678 B1 | 6/2003 | Wijmans et al. |
| 7,166,149 B2 | 1/2007 | Dunne et al. |
| 7,678,956 B2 | 3/2010 | Heinritz-Adrian |
| 8,444,749 B2 | 5/2013 | Sanders et al. |
| 8,801,839 B2 | 8/2014 | Vanderstraeten |
| 2004/0131902 A1* | 7/2004 | Frank ..................... C25B 15/02 |
| | | 204/266 |
| 2021/0170325 A1 | 6/2021 | Hermans |

(Continued)

FOREIGN PATENT DOCUMENTS

| | | |
|---|---|---|
| CN | 111232924 A | 6/2020 |
| DE | 102012218955 A1 | 5/2014 |

(Continued)

*Primary Examiner* — Frank M Lawrence, Jr.

(74) *Attorney, Agent, or Firm* — Schwegman Lundberg & Woessner, P.A.

(57) ABSTRACT

A system for drying hydrogen in a hydrogen production facility comprises an electrolyzer for producing a flow of hydrogen gas, a drying device configured to remove moisture from the flow of hydrogen gas, a compressor configured to receive the flow of hydrogen gas from the drying device, and a recirculation line connected to output of the compressor to recirculate at least a portion of the flow of hydrogen gas from the compressor to the drying device. A method of drying hydrogen in a hydrogen production facility comprises producing a flow of hydrogen gas with an electrolyzer, drying the flow of hydrogen gas with a drying device, compressing the flow of hydrogen gas from the drying device with a compressor, and recirculating at least a portion of the flow of hydrogen gas from the compressor to the drying device to maintain pressure distribution within the drying device.

20 Claims, 6 Drawing Sheets

(56)        References Cited

U.S. PATENT DOCUMENTS

2022/0033983 A1*  2/2022  Higginbotham ........ C25B 15/02
2022/0065162 A1    3/2022  Hunt et al.
2022/0290309 A1*  9/2022  Wehrman ............. F04D 29/705
2023/0167564 A1*  6/2023  Bonaquist ............... C25B 1/042
                                                    204/275.1

FOREIGN PATENT DOCUMENTS

EP         0692297  A2    1/1996
EP         0692297  A3    10/1996
EP         2974781  A1    1/2016
JP         6822867  B2    1/2021
WO    WO-2014060168  A3    2/2015

* cited by examiner

H2 DRYER FOR POWER PLANT USING ELECTROLYZER

TECHNICAL FIELD

This document pertains generally, but not by way of limitation, to combined-cycle power plants used to generate electricity. More specifically, but not by way of limitation, the present application relates to production of hydrogen and oxygen with electrolyzers in integrated combined-cycle power plants.

BACKGROUND

The grid is a mechanism to balance aggregate energy demand of consumers with aggregate energy supply of power producers, including renewable energy sources and traditional power plants, such as those that burn fossil fuels.

Renewable energy sources can comprise sources of energy that do not include combustion or release of CO2. Typical renewable energy sources include hydroelectric, solar and wind. Solar and wind, particularly, are intermittent and unpredictable.

Power plants can comprise a means to generate power on demand using fuels, such as fossil fuels or hydrogen derived from various sources. Fossil fuels can comprise coal, natural gas or fuel oil. Typical power plants comprise a gas turbine and an electrical generator, and frequently include a steam turbine in a combined-cycle configuration. The gas turbine and steam turbine can create electric power from mechanical energy converted from combustion of fuel and associated steam generation processes.

Consumers of electricity comprise any user of electrical power. Consumers can be residential consumers, commercial consumers or industrial consumers. Consumers can use energy in different ways, thereby placing widely differing demands on the grid.

Various factors can have a substantial impact on grid stability. Specifically, (1) when a large industrial consumer initiates (or discontinues) use of large quantities of power; or (2) when there are large variations in the demand for power by residential and/or commercial consumers during (a) peak periods, such as morning and evening, versus off-peak periods, such as over-night and mid-day and (b) seasonal variations in demand such as cooling load in summer, heating load in winter and relatively low demand for either in spring and fall; or (3) when the types of loads change on a system, such as large amounts of active loads being initiated or discontinued such as lighting with the rise and fall of daylight, and electric heaters that are initiated or discontinued as occurs with changing temperatures within the winter season; or (4) when the types of generation available changes, such as wind, solar, nuclear or fossil fuels with changing weather patterns at both a local, regional and national scale, either (a) in the short term in the case of changing weather systems or (b) on a seasonal basis as occurs with the transition from spring to summer to autumn to winter; or (5) how the consumers use the power can influence active and reactive power availability in addition to system voltage and frequency.

Attempts to balance grid supply and demand have involved the use of electrolyzers to produce hydrogen gas with power from the grid when renewable energy is plentiful, for example, for later usage in a gas turbine combined cycle power plant (GTCC) when demand is high or renewable energy is unavailable.

Pub. No. US 2022/0065162 A1 to Hunt et al., is titled "Integrated Power Production and Storage Systems."

Overview

The present inventors have recognized, among other things, that problems to be solved in integrated combined-cycle power plants using electrolyzers can include the presence of moisture in hydrogen gas produced by electrolyzers that is to be stored for use as fuel in gas turbine engines. For example, moisture in hydrogen can condense in cold ambient temperatures that often occur during nighttime. The condensed moisture can be carried over to the combustor of a gas turbine engine, which can cause pressure surges and instability in the combustion process. Furthermore, crossover oxygen in the hydrogen gas in the presence of condensed water can cause corrosion of storage vessels made of carbon steel, thereby creating a potential for leakage. As such, it can be advantageous to remove moisture from hydrogen gas before storage.

The present inventors have also recognized that hydrogen dryers operate more efficiently when supplied with an even flow of hydrogen gas. For example, hydrogen dryers are most effective at removing moisture when supplied with a threshold volume or pressure of hydrogen, such as at or near maximum output of an electrolyzer. However, if the volume or pressure of hydrogen gas provided to the hydrogen dryer is insufficient to distribute the hydrogen gas evenly across the hydrogen dryer, the hydrogen gas might not be adequately dried. For example, some of the hydrogen gas might be dried while other portions might not be dried, thereby reducing overall effectiveness of the drying process.

The present inventors have also recognized that during periods of reduced electrical output of a power plant, e.g., during turndown operations, it can be desirable to maintain operating levels of compressors used to pressurize hydrogen gas from electrolyzers. Compressors are typically used to provide hydrogen gas from the electrolyzers to storage systems at appropriate pressure levels. During turndown operations, it can be desirable to keep the compressors operating at a constant volumetric flow by routing a portion of the output of the compressors back to the compressor inlet. As such, the compressors can continue to operate without adjustment whether in a normal operating mode or a turndown mode.

The present subject matter can provide solutions to these problems and other problems, such as by providing a hydrogen gas drying system upstream of a compressor and including a recycling or recirculation loop that can reroute hydrogen gas downstream of the compressor back to the inlet of the hydrogen dryer to increase the volume or pressure within the hydrogen dryer, while simultaneously maintaining the volumetric flow through the compressor. In examples, hydrogen gas from the exit of a compressor can be rerouted back to the inlet of the hydrogen dryer. In examples, a portion of the total hydrogen gas flow downstream of the hydrogen dryer can be rerouted to the hydrogen dryer inlet that is commensurate with the reduced output of the electrolyzer during turndown. As such, the volume or pressure of hydrogen gas within the hydrogen dryer can be more evenly distributed across the functional aspects, e.g., drying beds, of the hydrogen dryer, thereby improving the moisture-removal from the hydrogen gas, at the same time as maintaining operational throughput of the compressor.

The present inventors have also recognized that a hydrogen dryer is more efficient at the low-pressure side (compressor suction) than the discharge side. The present inventors have also recognized that hydrogen gas at the downstream side of the compressor can have a cooler temperature than the upstream side and that is closer to the hydrogen gas temperature at the outlet of the electrolyzer. The present inventors have also recognized that it is desirable to maintain a hydrogen dryer feed at minimum temperature disturbance, that a hydrogen dryer is an exothermal process, and that it is desirable to not have cold hot spots in the dryer bed. As such, the present disclosure can route output of a hydrogen gas compressor to an inlet of the hydrogen dryer to achieve suitable temperature matching and improve pressure distribution within the hydrogen dryer to eliminate cold and dead spots.

In an example, a system for drying hydrogen in a hydrogen production facility can comprise an electrolyzer for producing a flow of hydrogen gas, a drying device configured to remove moisture from the flow of hydrogen gas, a compressor configured to receive the flow of hydrogen gas from the drying device, and a recirculation line connected to output of the compressor to recirculate at least a portion of the flow of hydrogen gas from the compressor to the drying device.

In another example, a method of drying hydrogen in a hydrogen production facility can comprise producing a flow of hydrogen gas with an electrolyzer, drying the flow of hydrogen gas with a drying device, compressing the flow of hydrogen gas from the drying device with a compressor, and recirculating at least a portion of the flow of hydrogen gas from the compressor to the drying device to maintain pressure distribution within the drying device.

In an additional example, a controller for operating a hydrogen production facility can comprise a pressure sensor interface for receiving input signals from a compressor, a kickback valve interface for providing an output signal to a kickback valve that controls recirculation between output of the compressor an inlet of a hydrogen dryer, and memory having stored therein instructions for operating the kickback valve based on compressor suction pressures received at the pressure sensor interface.

This overview is intended to provide an overview of subject matter of the present patent application. It is not intended to provide an exclusive or exhaustive explanation of the invention. The detailed description is included to provide further information about the present patent application.

Figure 1A:
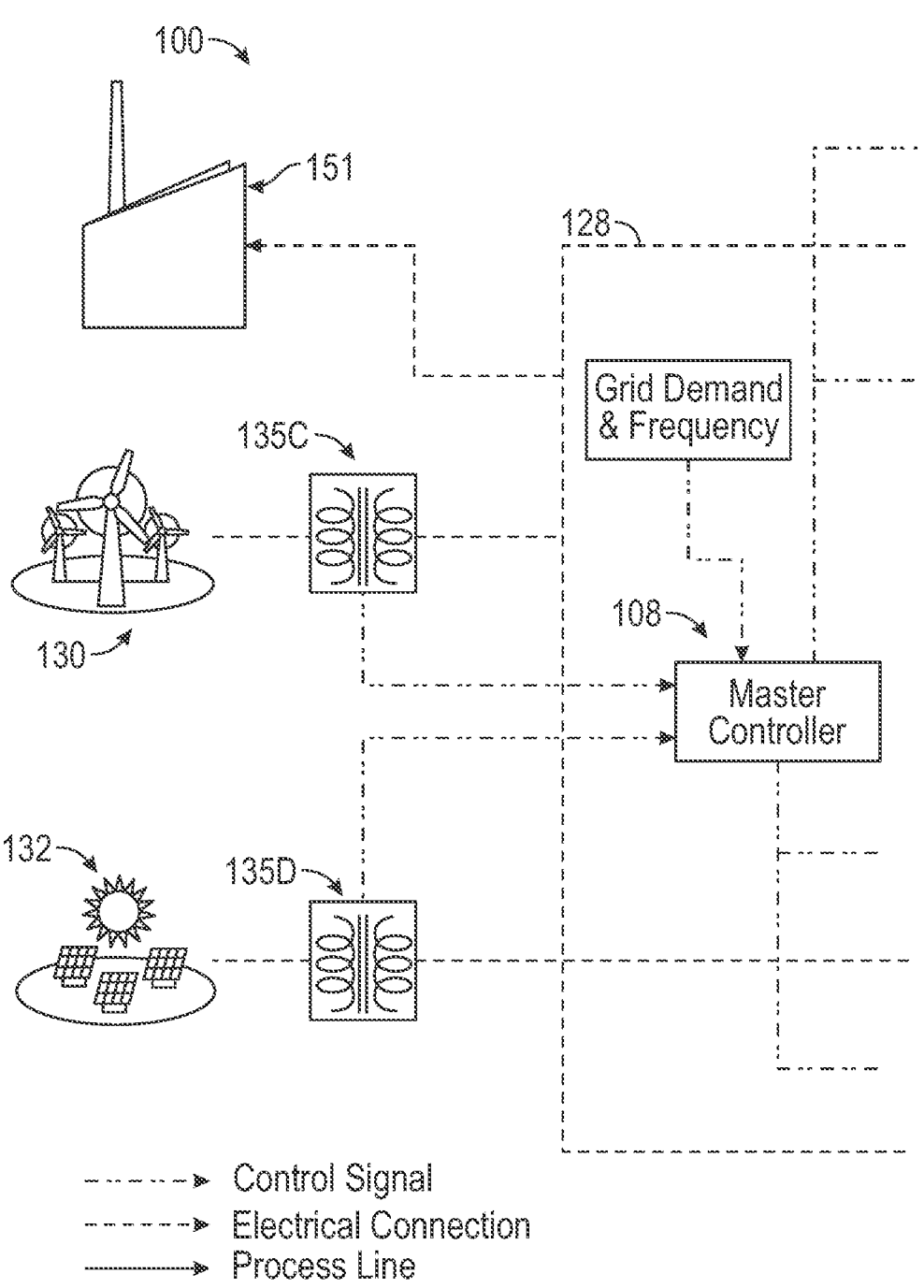
FIG. 1A and FIG. 1B together form a schematic diagram illustrating an integrated power production system comprising a gas turbine combined cycle power plant (GTCC), a hydrogen production system, a hydrogen drying system, a hydrogen storage system, and a controller.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1B:
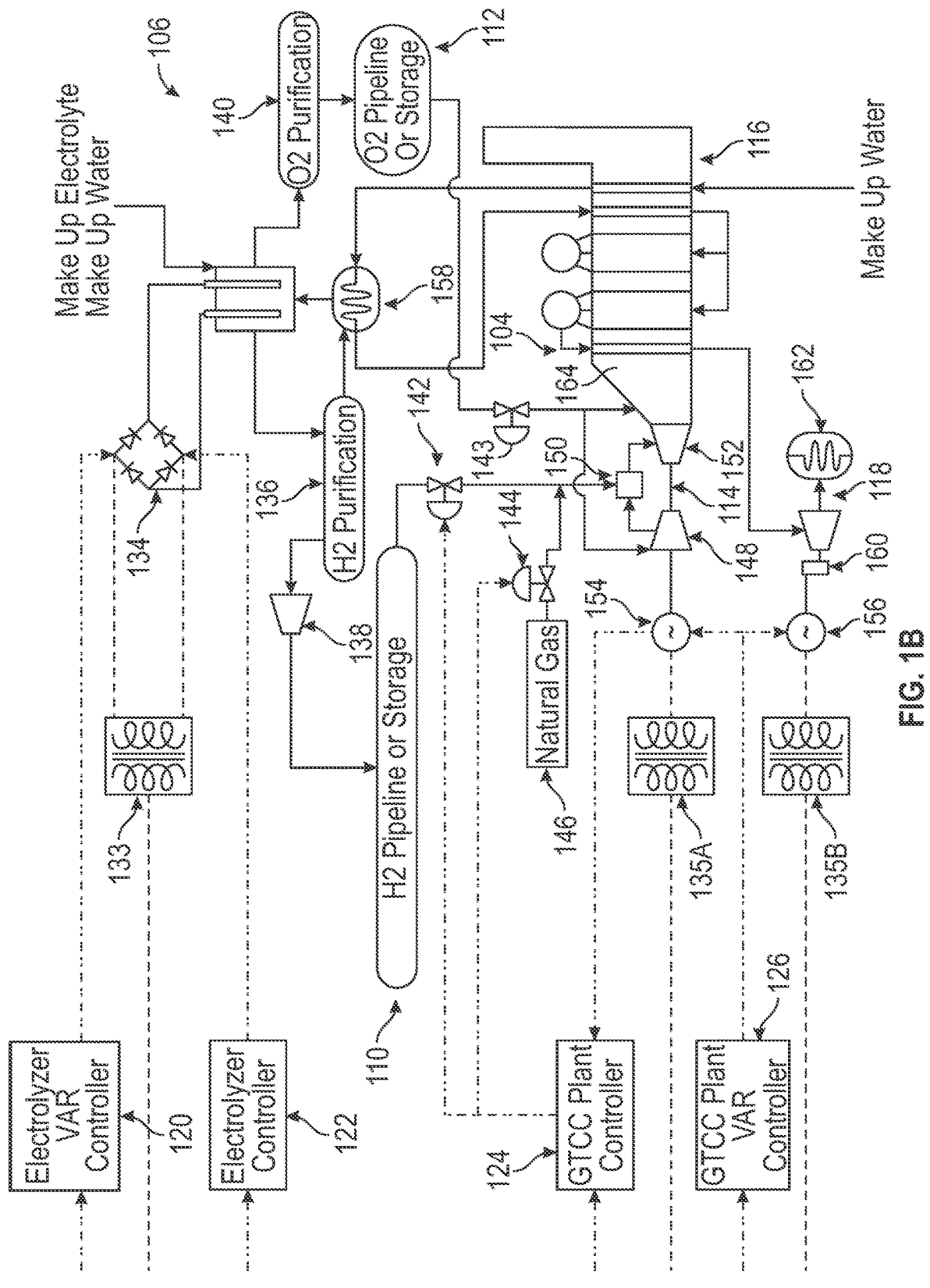

FIGS. 1A and 1B together form a schematic diagram illustrating integrated power production system 100 that provides many advantages over standard and prior art systems. Integrated power production system 100 can include gas turbine combined cycle power plant 104 ("GTCC 104"), hydrogen production system 106, and controller 108.

Control signals between various components and systems are designated via dash/dot lines, electrical connections through which electricity can flow are designated via dashed lines, and process lines, through which gases or fluids can flow, are designated via solid lines.

In examples, hydrogen production system 106 can comprise one or more electrolyzers, such as electrolyzer 200, that produces hydrogen gas (H2) and oxygen gas (O2). A single hydrogen production system 106 or electrolyzer is shown in FIGS. 1A and 1B, but more than one hydrogen production system 106 or electrolyzer can be used, as is illustrated in FIG. 3. Integrated power production system 100 can also include either or both of hydrogen storage system 110 and oxygen storage system 112. As is discussed below in greater detail, electrolyzer 200 can be operated in conjunction with hydrogen drying system 202 (FIG. 2) to remove moisture from hydrogen gas before being stored or used by GTCC 104. In examples, hydrogen drying system 202 (FIG. 2) can be part of hydrogen purification system 136.

GTCC 104 can comprise gas turbine 114, heat recovery steam generator 116 ("HRSG 116"), and steam turbine 118.

Controller 108 can be connected to hydrogen production system 106 via controllers 120 and 122. Controller 108 can be connected to GTCC 104 via controller 124 and controller 126.

Grid 128 provides electrical connection between various supplies of electricity, such as renewable wind electricity source 130, renewable photovoltaic solar electricity source 132 or gas turbine combined cycle power plant 104, and consumers 151 of electricity. Example consumers 151 include residential homes, commercial buildings, and industrial facilities. Different consumers 151 can utilize varying levels of active and reactive power.

Although only one consumer 151, one renewable wind electricity source 130, one renewable photovoltaic solar electricity source 132, one GTCC 104, one hydrogen production system 106, one hydrogen storage system 110 and one oxygen storage system 112 are shown in FIGS. 1A and 1B, integrated power production system 100 can include multiple instances of each, either at the same geographic locations or dispersed over a large geographic region.

Controller 108 provides, among other things, command signals to the various supplies of electricity, including renewable wind electricity source 130, renewable photovoltaic solar electricity source 132, and gas turbine 114, to ensure that the total supply and demand for electricity remains balanced. Controller 108, in conjunction with electrolyzer production and VAR (volt-ampere reactive) set point controllers 122, 120, respectively, and GTCC output and VAR setpoint controllers 124, 126, respectively, can ensure balance between supply and demand of active power, reactive power, system voltage and frequency. Controller 108 can also regulate when hydrogen is produced, or consumed, and when power is dispatched by using the stored hydrogen or producing hydrogen for storage. As discussed with reference to FIGS. 2-5, controllers 108, 120 and 122 can provide instructions to the various components of integrated power production system 100. Additionally, hydrogen drying system 202 can be provided with a controller (e.g., controller 213 of FIG. 3) to provide dry or non-moist hydrogen gas to hydrogen storage system 110.

Decisions of controller 108 can be made based on market conditions, renewable power availability, grid electricity costs, and other factors. Thus, controller 108 can manage power production from renewable wind electricity source 130, renewable photovoltaic solar electricity source 132 and GTCC 104 based on demand on grid 128, weather conditions and other factors, while also managing hydrogen production of hydrogen production system 106 using, for example, consumption of hydrogen and oxygen in GTCC 104 and an industrial facility and long term and short term storage of energy in the form of hydrogen and oxygen storage in hydrogen storage system 110 and oxygen storage system 112, respectively, and power in various batteries.

Electricity from grid 128 can be first provided to transformer 133 to transform the voltage of grid 128 to a selected voltage that is optimized for operation of power converter 134 to convert AC power to DC power. In examples, power converter 134 can be a rectifier and can be receptive of alternating current (AC) from grid 128, and productive of direct current (DC) as can be optimal for operation of electrolyzers of hydrogen production system 106. GTCC 104, steam turbine 118, renewable wind electricity source 130 and renewable photovoltaic solar electricity source 132 can be provided with transformers 135A-135D, respectively, to transform voltage of generated power to a voltage compatible with grid 128.

Hydrogen production system 106 can be connected to hydrogen purification system 136, which can use compressor 138 to provide hydrogen to hydrogen storage system 110, and oxygen purification system 140, which can provide oxygen to oxygen storage system 112. In additional examples, hydrogen purification system 136 can perform, or be replaced by, a system for performing drying operations to remove moisture content from the hydrogen gas. Controller 108 can control flow of hydrogen, oxygen and natural gas to GTCC 104 based on many factors, such as availability of renewable energy, to optimize total output, power and hydrogen, of integrated power production system 100.

Gas turbine combined cycle power plant 104 includes gas turbine 114, HRSG 116, and steam turbine 118. The functions and operation of combined GTCC 104 will be appreciated by one of skill in the art and many of the details of which are not described here for brevity. Gas turbine 114 includes compressor 148, combustor 150, and turbine 152. Compressor 148, turbine 152 and electrical generator 154 can be physically connected via one or more shafts, and turn together. Air is introduced to compressor 148, compressor 148 compresses the air, and fuel is introduced to the compressed air in combustor 150. The fuel is ignited, and the combustion products have greatly increased temperature and pressure (and energy) relative to that of the compressed air. The high energy combustion products expand in turbine 152 driving compressor 148 and electrical generator 154.

After the high energy combustion products exit gas turbine 114, they are referred to as exhaust gas, and are channeled through HRSG 116. HRSG 116 can include one or more heat exchange assemblies that transfer heat from the exhaust gas to water. The water can be in the form of liquid water (i.e., "feedwater") or steam. HRSG 116 can have various stages to produce steam at particular properties of temperature and pressure. The steam is then directed to steam turbine 118, which can be physically connected to electrical generator 156 via clutch 160. In examples, clutch 160 can be omitted. From steam turbine 118, the steam can flow into heat exchanger 162, such as a condenser in which the steam can be cooled. Heat from steam and water from HRSG 116 can additionally be put into other systems. For example, heat from the feedwater, condensate, or steam of HRSG 116 can be used to warm, e.g., elevate and maintain the temperature of, electrolyzer 200 of hydrogen production system 106 using, for example, condenser 158 or heat exchanger 162. Electrical generator 156 can, in some examples, be the same generator connected to gas turbine 114, or in other examples can be a separate generator (as is shown in FIGS. 1A and 1B). The steam can expand within steam turbine 118, and transfer torque to electrical generator 156 to create electricity. Thereafter the steam can be condensed to liquid water and return to HRSG 116 to be reheated to the particular properties. As is customary, it will be appreciated that the water can circulate between HRSG 116 and steam turbine 118 in a loop.

In examples, controller 108 is a master controller that is in signal communication with at least of one of electrolyzer VAR (volt-ampere reactive) set point controller 120, electrolyzer production set point controller 122, GTCC plant output controller 124, and GTCC plant VAR setpoint controller 126, each of which can be responsive to command signals provided by controller 108 as described in further detail below.

Hydrogen production system 106 can produce hydrogen using a number of different processes. Water (H2O) can also be split into hydrogen (H2) and oxygen (O2) using electrolysis, as can be provided by electrolyzer 200, or solar energy.

In examples, hydrogen production system 106 comprises electrolyzer 200. Electrolyzer 200 can be an electrical device that can operate to consume electricity to convert water into its constituent elements, hydrogen and oxygen. Electrolyzer 200 can consume direct current electrical power and utilize power converter 134 to convert alternating current to direct current. Hydrogen can be stored in hydrogen storage system 110, which can comprise a tank, pipeline, salt cavern or other geologic repository. Electrolyzer 200 of hydrogen production system 106 is generally receptive of inputs of water and electricity, and productive of hydrogen gas and oxygen gas, as would be appreciated by one of skill in the art.

Electricity can be provided via grid 128, which can collect electricity and distribute the electricity where needed. Grid 128 can obtain electricity from one or more of a variety of electrical sources, such as renewable wind electricity source 130 and renewable photovoltaic solar electricity source 132. Grid 128 can also obtain electricity from other sources, such as from hydroelectric sources, nuclear sources, one or both of electrical generator 154 and electrical generator 156 of gas turbine 114 and steam turbine 118, respectively, of GTCC 104 or other gas turbine generators connected to grid 128.

The operation of electrolyzer 200 of hydrogen production system 106 can be responsive to production set point controller 122. Production set point controller 122 can control the amount of direct current to provide to electrolyzer 200. Provision of direct current and water to electrolyzer 200 is directly related to the production of hydrogen gas and oxygen gas.

The operation of electrolyzer 200 of hydrogen production system 106 can also be responsive to electrolyzer VAR set point controller 120. VAR set point controller 122 can control the amount of alternating current that is converted to direct current to be provided to electrolyzer 200.

Furthermore, with the hydrogen drying systems and methods of the present disclosure, the compressed hydrogen gas can be rerouted to the inlet of hydrogen drying device 204 (FIG. 3) to simultaneously maintain a threshold volumetric flow rate through compressor 138 and hydrogen drying device 204. In examples, controller 213 (FIG. 3) can utilize pressure inputs from hydrogen gas compressor 138 to control a kickback valve that reroutes compressor output to a hydrogen dryer input.

Power inverters convert DC to AC power. Power inverters are grid connected devices that allow for putting power into grid 128. Typical use of power inverters is unidirectional, and can be at renewable photovoltaic solar electricity source 132 or fuel cells, for example.

It will be appreciated that electrolyzer 200 of hydrogen production system 106 can be receptive of water and DC electricity from power converter 134 to produce hydrogen gas and oxygen gas. The hydrogen gas can proceed to hydrogen purification system 136, compressor 138, and into hydrogen storage system 110. Likewise, the oxygen gas can proceed to oxygen purification system 140 and into oxygen storage system 112. A similar oxygen compressor can optionally be used. Although examples have been described herein as alkaline electrolytic electrolyzers, it will be appreciated that the scope of the disclosure is not so limited, and is contemplated to include other electrolyzer arrangements, such as polymer electrolyte membrane (PEM) electrolysis units.

Hydrogen storage system 110 can include a salt cavern to store the hydrogen gas. In some examples, hydrogen storage system 110 can include one or more lengths of pipe or pressure vessels such as "bullet" shape or spheres that are highly pressurized to store the hydrogen.

The hydrogen gas within the hydrogen storage system 110 can be used as a fuel, and provided to combustor 150 of gas turbine 114. Valve 142 and valve 144 can be responsive to GTCC plant output controller 124 to provide a flow of hydrogen and natural gas fuels to gas turbine 114. Under some conditions, controller 124 can command valve 142 and valve 144 such as to provide only one fuel (either natural gas or hydrogen) to gas turbine 114. Under other conditions, controller 124 can command valve 142 and valve 144 such as to provide a blend of both natural gas and hydrogen to gas turbine 114. As discussed herein, output of electrolyzer 200 can be processed with hydrogen purification system 136 to remove impurities, including water, to improve the storability and combustibility of the hydrogen gas. Hydrogen drying system 202 (FIG. 2) of hydrogen purification system 136 can comprise a device for removing moisture content from hydrogen gas. Electrolyzer controllers 120 and 122 can operate independently to maintain the output of electrolyzer 200 at a desired level, which can vary between a normal or full operating mode and a turndown or partial operating mode. Electrolyzer controllers 120 and 122 can additionally operate hydrogen purification system 136, including hydrogen drying system 202, to provide drying devices with a steady flow, e.g., constant volumetric flow rate, of hydrogen gas, regardless of the output level of electrolyzer 200, to improve overall moisture removal from the hydrogen gas.

Figure 2:
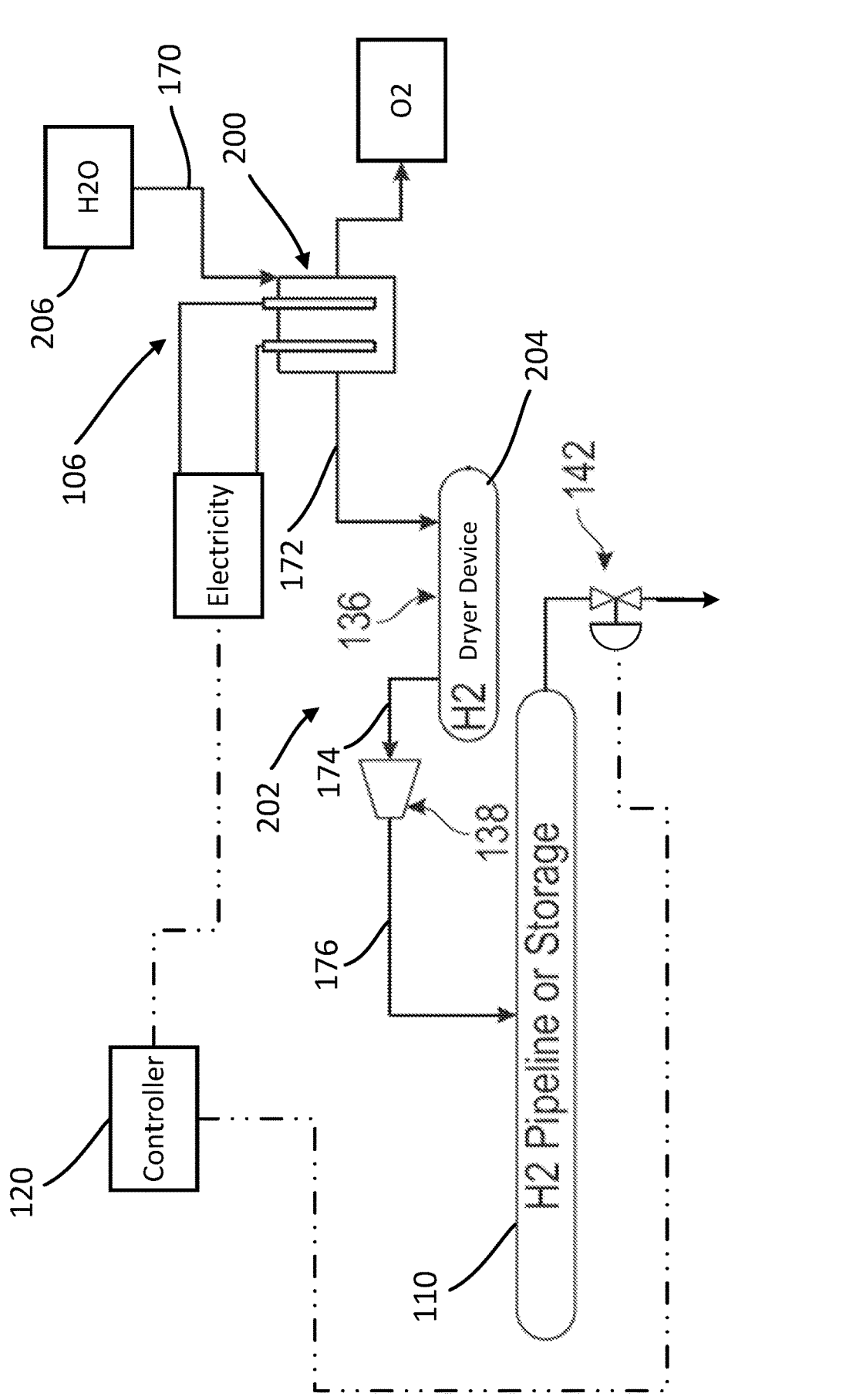
FIG. 2 is a schematic diagram illustrating the hydrogen drying system incorporated into the hydrogen production system of the integrated power production system of FIGS. 1A and 1B.
Figure 3:
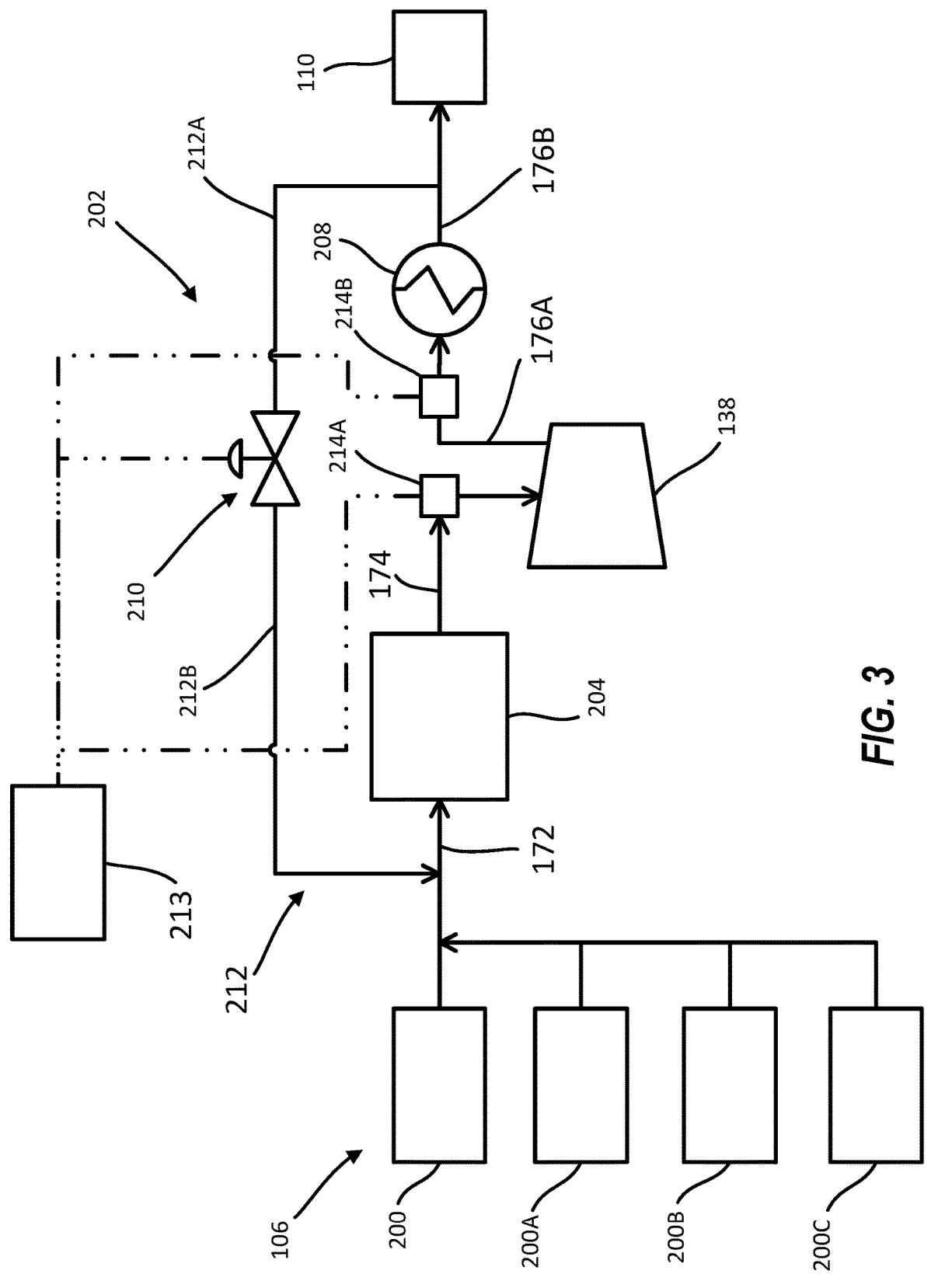
FIG. 3 is a schematic diagram illustrating a hydrogen drying system of the present disclosure suitable for use with the hydrogen production system of FIG. 2.

FIG. 2 is a schematic diagram illustrating hydrogen drying system 202 incorporated into hydrogen production system 106 of integrated power production system 100 of FIGS. 1A and 1B. Hydrogen drying system 202 can comprise hydrogen drying device 204, which can be used in conjunction with, as part of, or alternatively to hydrogen purification system 136. As discussed with reference to FIGS. 1A and 1B, hydrogen production system 106 can be integrated with other portions of integrated power production system 100, such as HRSG 116, gas turbine 114, steam turbine 118, and others.

Electrolyzer 200 can receive inputs of electricity and water (H2O) to produce outputs of hydrogen gas (H2) and oxygen gas (O2). Electrolyzer 200 can be connected to make-up water source 206 at line 170. Hydrogen purification system 136 receives a stream or flow of hydrogen gas from electrolyzer 200 at line 172. One or both of hydrogen purification system 136 and hydrogen drying device 204 can perform drying operations to remove moisture from the hydrogen gas. Compressor 138 can receive hydrogen gas from hydrogen purification system 136 via line 174. Compressed hydrogen gas can be provided to hydrogen storage system 110 from compressor 138 via line 176.

Hydrogen drying device 204 can comprise a variety of different gas drying technology. In examples, hydrogen drying device 204 can comprise coalescing, refrigerated and deliquescent dryers. In examples, hydrogen drying device 204 can comprise desiccant, absorption, and membrane dryers. In particular examples, hydrogen drying device 204 can comprise a desiccant dryer, which includes adsorption beds of a desiccant material that the hydrogen gas passes through. The desiccant at material comprises material, such as activated alumina, that has a high affinity for water. Thus, as the hydrogen gas passes over the adsorption beds, the desiccant material pulls water from the hydrogen gas. Adsorption bed dryers typically operate more efficiently when hydrogen gas is evenly distributed therein, so as to be better dispersed across the beds of desiccant material. Thus, adsorption bed dryers typically operate when provided with a volumetric flow rate that substantially matches the volumetric capacity of the adsorption beds.

During normal operation all the output of electrolyzer 200 can be output to hydrogen storage system 110. Compressor 138 can be sized for the output of electrolyzer 200. Thus, compressor 138 can have a capacity that is commensurate to the maximum output of electrolyzer 200. Thus, operation of compressor 138 can be most efficient when compressor 138 is pushing hydrogen gas near capacity. Likewise, hydrogen drying device 204 can be sized for the output of electrolyzer 200. Thus, hydrogen drying device 204 can have a capacity that is commensurate to the maximum output of electrolyzer 200. Typically, electrolyzer 200 is operated under normal operating conditions at or near maximum output, thereby allowing compressor 138 and hydrogen drying device 204 to operate at maximum capacity. Compressor 138 and hydrogen drying device 204 can thus be configured to operate efficiently within a certain threshold of their respective maximum throughputs. The threshold can be a percentage below the design capacity of compressor 138 and hydrogen drying device 204, such as 25% below, 10% below or 5% below. The threshold for compressor 138 and hydrogen drying device 204 can be different. The thresholds can, for example, take into account safety and maintenance considerations relating to operating at capacity or over capacity.

Electrolyzer 200 does not always operate at maximum output, thereby reducing the volumetric flow of hydrogen gas to compressor 138 and hydrogen drying device 204. For example, electrolyzer 200 can be operated during turndown operations where the output of electrolyzer 200 is substantially less than maximum output. Turndown operations typically occur during start-up of electrolyzer 200 or to accommodate grid conditions. In examples, turndown operations can be approximately 40% or less of the maximum output of an electrolyzer train. Thus, turndown of 40% for a twenty electrolyzer train can result in a 2% turndown for the hydrogen dryer. In order to maintain efficient operation of compressor 138 and hydrogen drying device 204 during turndown, a portion of the output of electrolyzer 200 can be rerouted through compressor 138 and hydrogen drying device 204. In examples, compressor 138 can be located downstream of hydrogen drying device 204 and recirculation loop can be provided that connects output of compressor 138 with input of hydrogen drying device 204, as shown in FIG. 3.

FIG. 3 is a schematic diagram illustrating hydrogen drying system 202 of the present disclosure suitable for use with hydrogen production system 106 of FIG. 2. Hydrogen production system 106 can include electrolyzer 200 of FIG. 1B, as well as the addition of electrolyzer 200A, electrolyzer 200B, electrolyzer 200C and electrolyzer 200D. Hydrogen drying system 202 can comprise hydrogen drying device 204, heat exchanger 208 and kickback valve 210. Compressor 138 can be used to pressurize the hydrogen gas from hydrogen production system 106 and provide motive force for flowing the hydrogen gas to hydrogen storage system 110 (FIG. 2).

Electrolyzers 200-200D can comprise a bank of electrolyzers that can operate together to provide output to hydrogen drying system 202. In the illustrated example, a single electrolyzer bank of four electrolyzers is used. However, any number of electrolyzer banks each including any number of electrolyzers can be used. Likewise, FIG. 3 illustrates a single hydrogen drying device 204. However, multiple hydrogen drying devices 204 can be used, such as in a parallel flow configuration. In various configurations, the total volumetric output of all the electrolyzer 200 can be matched to the total volumetric capacity of all the hydrogen drying devices 204 and compressor 138.

Output of electrolyzers 200-200C can enter the inlet hydrogen drying device 204 at line 172. Output of hydrogen drying device 204 can enter the inlet of compressor 138 at line 174. Output of compressor 138 can enter the inlet of hydrogen storage system 110 at line 176 (FIG. 2), which can be divided into lines 176A and 176B to receive heat exchanger 208. Recirculation line 212 can connect the outlet of compressor 138 to the inlet of hydrogen drying device 204. Kickback valve 210 can be placed in recirculation line 212 between segments 212A and 212B. In additional examples, segment 212A can connect to line 176A.

Operation of electrolyzers 200-200C and kickback valve 210 can be controlled by controllers 120 and 122 of integrated power production system 100 (FIGS. 1 And 1B). During normal operating modes where each of electrolyzers 200-200C is operating at or near maximum output, kickback valve 210 can be closed. As such, hydrogen gas can travel from electrolyzers 200-200C, through line 172, into hydrogen drying device 204, through line 174, into compressor 138, through line 176A, into heat exchanger 208, through line 176B, and into hydrogen storage system 110. During turndown operating modes where the total output of electrolyzers 200-200C is reduced, such as to approximately 25% of maximum, kickback valve 210 can be opened. As such, hydrogen gas can travel from electrolyzers 200-200C, through line 172, into hydrogen drying device 204, through line 174, into compressor 138, through line 176A, into heat exchanger 208, and into line 176B. From line 176B, flow of hydrogen gas can be split or divided between hydrogen storage system 110 and segment 212A of recirculation line 212.

The proportion of flow split between hydrogen storage system 110 and segment 212A can be determined based on the difference in volumetric output of electrolyzers 200-200C between the normal and turndown operating modes. During turndown operation, a portion of hydrogen gas can be recycled through segment 212A such that, eventually, enough volume of hydrogen gas would be recirculated so that hydrogen drying device 204 and compressor 138 are operating at full volumetric capacity. Note, that hydrogen drying device 204 would be performing less overall actual drying since a portion of the volume of hydrogen gas provided to hydrogen drying device 204 would already have been dried. Likewise, compressor 138 would be doing less work since a portion of the volume of hydrogen gas provided to compressor 138 would already have been compressed. In examples, if electrolyzer 200 produces 25% of dryer design capacity, kickback valve 210 can maintain the minimum dryer threshold (i.e., 50%) as well as maintain minimum compressor suction pressure. As discussed with reference to pressure sensors 214A and 214B, controller 213 can utilize inlet and outlet pressures of compressor 138 to control turndown recirculation.

Segment 212B can return directly to line 172 so that the recirculated hydrogen gas is mixed with new hydrogen gas before entering hydrogen drying device 204. In other examples, segment 212B can be plumbed directly into hydrogen drying device 204, such as at a different location than line 172 to facilitate distribution of hydrogen gas volume within hydrogen drying device 204.

The piping diameter of segment 212A and segment 212B can be selected based to control flow distribution between kickback valve 210 and hydrogen storage system 110. For example, segment 212A and segment 212B can be sized smaller than line 176B and line 172 to ensure that less than all of the output of compressor 138 is recirculated and some output of compressor 138 is forwarded to hydrogen storage system 110.

In examples, kickback valve 210 can comprise a modulating valve where kickback valve 210 is either fully open or fully closed. In other examples, kickback valve 210 can comprise a variable flow valve where flow can be controlled anywhere between 100% and 0%. In examples, kickback valve 210 can be controlled by controller 213 to be open in turndown operating modes and closed in normal operating modes. In examples, kickback valve 210 can be actively modulated to be opened or closed, or in a partially open state, to control flow distribution between segment 212A and hydrogen storage system 110 to maintain the volumetric flow through one or both of hydrogen drying device 204 and compressor 138 at or near capacity. In examples, pressure sensors can be positioned on one or more of line 174 and 176A at the inlet and outlet of compressor 138, to monitor volumetric flow of hydrogen gas therethrough and facilitate coordinated volumetric flow of hydrogen gas through hydrogen drying system 202. Controller 213 can be connected to the pressure sensors to control operation of kickback valve 210. In examples, pressure sensor 214A can be positioned in line 174 to sense the pressure of hydrogen gas entering compressor 138 and pressure sensor 214B can be positioned in line 176A to sense the pressure of hydrogen gas leaving compressor 138. In examples, controller 213 can thus control the operating state of kickback valve 210 to control the volumetric flow of hydrogen gas in recirculation line 212 so that the total flow entering hydrogen drying device 204, i.e., the flow from line 172 and recirculation line 212, is sufficient to maintain pressure within hydrogen drying device 204 and sufficient to maintain volumetric flow within compressor 138.

Heat exchanger 208 can be positioned in line 176 to cool compressed gas leaving compressor 138. Heat exchanger 208 can be used to remove heat from the hydrogen gas to prevent overheating components of hydrogen drying system 202. Heat exchanger 208 can be provided with a variety of cooling mediums, such as cooling water from HRSG 116 (FIG. 1B). In examples, heat exchanger 208 can be replaced by another cooling device, such as a heat sink or a refrigeration device.

Figure 4:
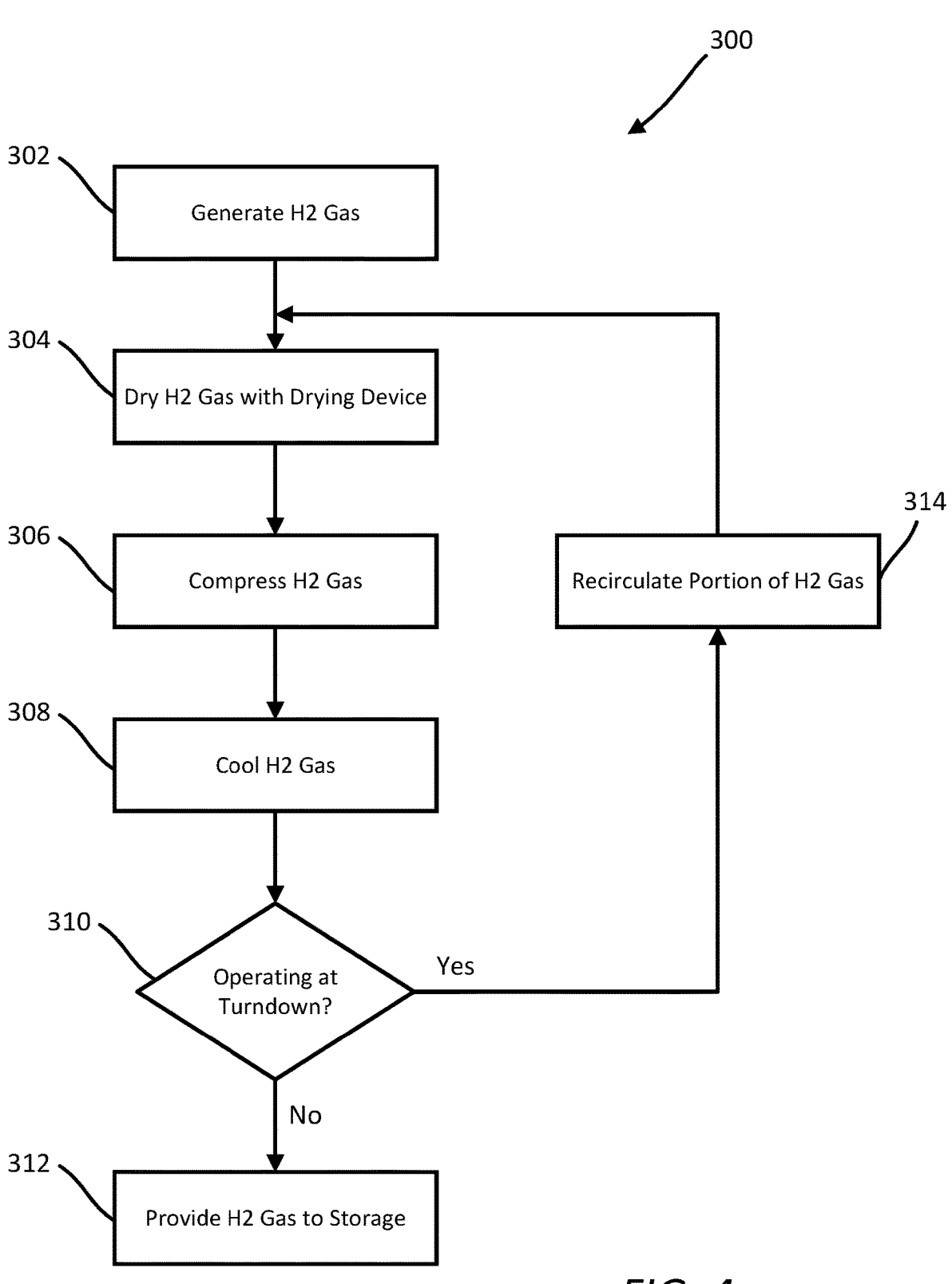
FIG. 4 is a line diagram illustrating operations of methods for drying hydrogen from an electrolyzer for use in a gas turbine combined cycle power plant.

FIG. 4 is a line diagram illustrating operations of method 300 for drying hydrogen gas from electrolyzer 200 in gas turbine combined cycle power plant 104 using hydrogen drying system 202. Method 300 can comprise operation 302 through operation 314 that describe various procedures for recirculating hydrogen gas through hydrogen drying device 204 and compressor 138 according to the present disclosure to, for example, maintain volumetric flow therethrough. In various examples, additional operations consistent with the devices, systems methods and operations described herein can be included. Likewise, some of operation 302—operation 314 can be omitted.

At operation 302, hydrogen gas, e.g., H2, can be generated. For example, one or all of electrolyzers 200-200C can be operated so that water can be converted to hydrogen gas and oxygen gas. Electrolyzer 200 can be selectively operated when it is desirable to produce hydrogen gas and oxygen gas with electricity, such as when renewable wind electricity source 130 and renewable photovoltaic solar electricity source 132 are operating. In examples, electrolyzer 200 can be operating while GTCC 104 (FIG. 1B) is operating. Thus, in a normal operating state, electrolyzers 200-200C can be operating at or near maximum capacity to generate a constant volumetric flow of hydrogen gas.

At operation 304, the hydrogen gas generated at operation 302 can be dried with a drying device. In examples, hydrogen drying device 204 can be used to remove moisture form the hydrogen gas. For example, hydrogen gas containing moisture from electrolyzers 200-200C can be passed over adsorption beds containing beads of desiccant material that can draw the moisture out of the hydrogen gas. At maximum output of electrolyzers 200-200C, volumetric flow of hydrogen gas through hydrogen drying device 204 can provide effective flow of hydrogen gas over all or substantially all portions of the adsorption beds, thereby ensuring that the adsorption beds are put to maximum use and the maximum amount of drying occurs.

At operation 306, the hydrogen gas exiting the drying device can be compressed. In examples, compressor 138 can be used to increase the pressure of the hydrogen gas. At maximum output of electrolyzers 200-200C, volumetric flow of hydrogen gas through compressor 138 can be at or near the capacity of compressor 138. Compressor 138 can be configured to have a fixed piston stroke and a fixed piston bore, and can be configured to operate at a fixed speed. As such, compressor 138 can have a fixed volumetric flow rate. As such, if a sufficient volume of hydrogen gas is not provided to the inlet of compressor 138, performance issues can occur, such as inadequate flow rates and pressures within hydrogen production system 106 (FIG. 1B). Furthermore, it can be costly to actively control the speed of compressor 138.

At operation 308, the dried and compressed hydrogen gas can be cooled. In examples, heat exchanger 208 can be used to decrease the temperature of the hydrogen gas. For example, it can be desirable to remove heat generated during compression of the hydrogen gas within compressor 138 for hydrogen gas that is recirculated through segment 212A and segment 212B to prevent heat accumulating within the recirculated hydrogen gas that can damage components of hydrogen production system 106, such as check valves and sealing rings. In examples, operation 308 can be selectively performed only when operation 314 is performed. Thus, controller 213 can coordinate flow of cooling medium through heat exchanger 208 when kickback valve 210 is open. In examples, a cooling medium can continuously flow through heat exchanger 208 regardless of the operating state of kickback valve 210.

At operation 310, the operating state of the hydrogen production of operation 302 can be determined. If hydrogen production system 106 is operating under normal operating conditions, such as at maximum output, method 300 can continue to operation 312. If hydrogen production system 106 is operating under turndown operating conditions, such as less than maximum output, method 300 to proceed to operation 314. Controller 213 can determine if hydrogen production system 106 is operating in a turndown mode by checking the pressure of hydrogen gas at the inlet and outlet of compressor 138. In examples, controller 213 can be provided with an instruction that electrolyzers 200-200C are operating in a turndown state from controller 108 (FIG. 5) of integrated power production system 100 (FIG. 1B).

At operation 312, all of the output of operation 302 can be transmitted to hydrogen storage system 110 (FIG. 1B). Hydrogen gas produced by electrolyzers 200-200C can flow to hydrogen storage system 110 under pressure provided by compressor 138. As such, hydrogen gas can be stored for subsequent or concurrent use by GTCC 104 (FIG. 1B).

At operation 314, some of the output of operation 302 can be transmitted to hydrogen storage system 110 (FIG. 1B), while a portion of the output of operation 302 can be rerouted back to operation 304, to the inlet of hydrogen drying device 204. Hydrogen gas can be split off from line 176B (FIG. 3) to enter segment 212A when kickback valve 210 is opened. For example, after controller 213 receives an input to determine that electrolyzers 200-200C are operating in a turndown mode, controller 213 can issue a control signal to kickback valve 210 to cause kickback valve 210 to open. As discussed herein, kickback valve 210 can be fully opened, partially opened or modulated to control flow through segment 212A and segment 212B to maintain volumetric flow through hydrogen drying device 204 and compressor 138 at or near capacity and to route excess hydrogen gas beyond what is needed to maintain volumetric flow through hydrogen drying device 204 and compressor 138 at or near capacity to hydrogen storage system 110.

Figure 5:
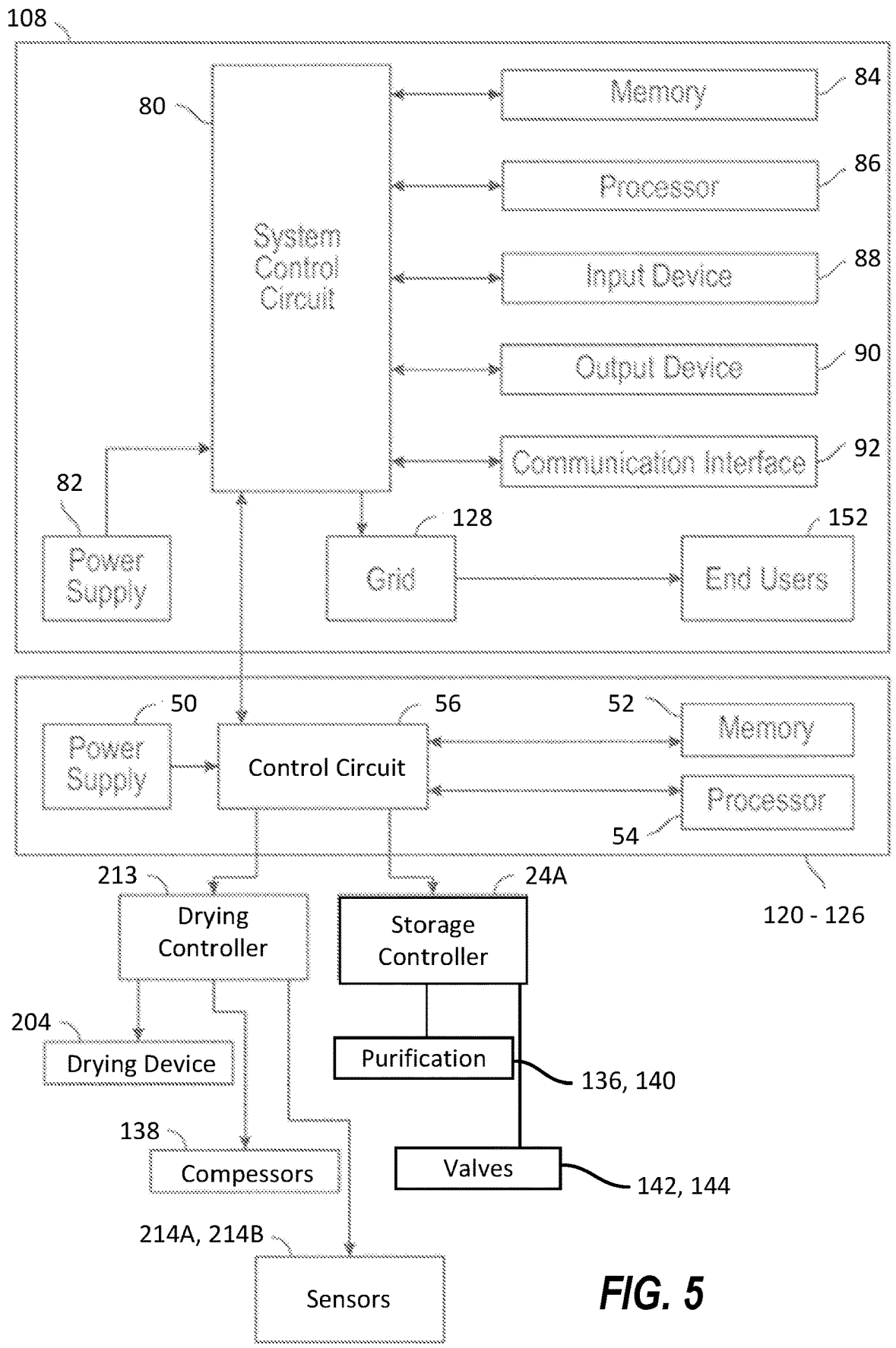
FIG. 5 is a schematic diagram illustrating components of a controller for operating an integrated power production system and controllers for operating a GTCC power plant, a hydrogen production system and a hydrogen drying system of the present disclosure.

FIG. 5 is a schematic diagram illustrating components of controller 108 for operating integrated power production system 100 and controllers 120-126 for operating hydrogen production system 106, GTCC 104 and hydrogen drying system 202. Controller 108 can include circuit 80, power supply 82, memory 84, processor 86, input device 88, output device 90 and communication interface 92. Controller 108 can be in communication with grid 128, which can provide power to end users or consumers 151. Controller 108 can also be in communication with controllers 120 and 122 for hydrogen production system 106 and controllers 124 and 126 for GTCC 104, which can be in communication with one or more sub-system controllers, such as electrolyzer controller 24A and dryer controller 213. Controller 24A can be in communication with hydrogen storage system 110 and oxygen storage system 112, as well as various components thereof, such as valves 142-144, compressor 138, hydrogen purification system 136 and oxygen purification system 140. Controller 213 can be in communication with hydrogen drying device 204, pressure sensors 214A and 214B, compressor 138, and kickback valve 210 and other equipment useful in controlling and operating hydrogen drying system 202, such as switches, valves, motors and the like.

Controllers 120-126, controller 24A and controller 213 can also include various computer system components that facilitate receiving and issuing electronic instructions, storing instructions, data and information, communicating with other devices, display devices, input devices, output devices and the like. For example, controllers 120-126 can each include power supply 50, memory 52, processor 54, control circuit 56 and the like.

Circuit 80 can comprise any suitable computer architecture such as microprocessors, chips and the like that allow memory 84, processor 86, input device 88, output device 90 and communication interface 92 to operate together. Power supply 50 and power supply 82 can comprise any suitable method for providing electrical power to controller 108 and controllers 120-126, respectively, such as AC or DC power supplies. Memory 84 and memory 52 can comprise any suitable memory devices, such as random access memory, read only memory, flash memory, magnetic memory and optical memory. Input device 88 can comprise a keyboard, mouse, pointer, touchscreen and other suitable devices for providing a user input or other input to circuit 80 or memory 84. Output device 90 can comprise a display monitor, a viewing screen, a touch screen, a printer, a projector, an audio speaker and the like. Communication interface 92 can comprise devices for allowing circuit 80 and controller 108 to receive information from and transmit information to other computing devices, such as a modem, a router, an I/O interface, a bus, a local area network, a wide area network, the internet and the like.

Controller 108 can be configured to operate grid 128 and, as such, can be referred to the "home office" for integrated power production system 100. Grid 128 can comprise hydrogen production system 106, GTCC 104, renewable wind electricity source 130, renewable photovoltaic solar electricity source 132, high voltage transmission lines that carry power from distant sources to demand centers, and distribution lines that connect consumers 151. Grid 128 can be configured to operate at a control frequency where all power input into the grid from disparate sources in input at the same frequency to facilitate integration of the power. In an example, grid 128 can operate at a control frequency of 60 Hertz (Hz).

Controller 108 can determine the demand being placed on grid 128, such as by monitoring the consumption of consumers 151. Controller 108 can coordinate generation of power from GTCC 104, renewable wind electricity source 130 and renewable photovoltaic solar electricity source 132. Controller 108 can assign or instruct GTCC 104 how much power output they should contribute to grid 128, and such assignment may be dynamic and reactive based upon the capabilities and availability of any of GTCC 104, renewable wind electricity source 130 and renewable photovoltaic solar electricity source 132. Controller 108 can ensure that the total power generated by GTCC 104, renewable wind electricity source 130 and renewable photovoltaic solar electricity source 132 meets the power demand of consumers 151. If power demand of consumers 151 exceeds or is less than power supplied by GTCC 104, renewable wind electricity source 130 and renewable photovoltaic solar electricity source 132, controller 108 can dictate response strategies for GTCC 104. Thus, controller 108 can interface with controller 124 and 126 for GTCC 104.

Circuit 80 can communicate with, that is, read from and write to, a memory device such as memory 84. Memory 84 can include various computer readable instructions for implementing operation of grid 128. Thus, memory 84 can include instructions for monitoring demand on and power being supplied to grid 128. Circuit 80 can be connected to various sensors to perform such functions. Memory 84 can also include information that can assist controller 108 in providing instruction to controllers 120-126. For example, memory 84 can include the type, size (capacity), age, maintenance history, location, the location within the geography covered by grid 128, and proximity to consumers 151 of each of GTCC 104. Memory 84 can also include instructions for determining the percentage of GTCC 104, as well as other power plants, contribution to the total power supply.

Controllers 120-126, 24A and 213 can be configured to operate GTCC 104, hydrogen production system 106 and hydrogen drying system 202. Memory 52 can include various computer readable instructions for implementing operation of GTCC 104 and hydrogen production system 106. Thus, memory 52 can include instructions for monitoring a power generation assignment from controller 108, instructions for power generation for each of electrical generator 154 and electrical generator 156, and the like. Memory 52 can additionally include instructions for operating electrolyzers 200-200C and hydrogen drying system 202, such as by including operating parameters for normal and turndown operating modes.

Additionally, memory 52 can include operational efficiency information, such as productive and economical efficiency information for each of electrical generator 154 and electrical generator 156, including gas turbine 114. For example, memory 52 can include the electrical production efficiency of each of turbine 114. Memory 52 can include economical information such as maintenance and economical history for gas turbine 114, as well as time since last service, repair, overhaul, refurbishment status, etc. Memory 52 can also include information relating to operational efficiency of GTCC 104 including the financial efficiency of each of gas turbine 114, such as various contractual obligations for operators of various power plants and manufacturers of and service providers for gas turbine 114.

Controllers 120-126 can operate or be in communication with controller 24A and controller 213 to operate compressor 138, turbine 226, compressor 254, valves 142-144, hydrogen purification system 136 and oxygen purification system 140, kickback valve 210, hydrogen drying system 202 and other control elements, as well as other components of integrated power production system 100.

Controller 108 can work in conjunction with controllers 120-126 to operate controller 24A and controller 213 to maximize or most efficiently operate integrated power production system 100, such as by controlling operation of hydrogen production system 106 and hydrogen drying system 202 to produce hydrogen when conditions on grid 128 permit, and operating hydrogen production system 106 and hydrogen drying system 202 in turndown conditions, such as when grid 128 does not require power form GTCC 104. Thus, memory 52 and memory 84 can include instructions for operating or performing any of the methods described herein, such as those described with reference to FIG. 5.

VARIOUS NOTES & EXAMPLES

Example 1 is a system for drying hydrogen in a hydrogen production facility, the system comprising: an electrolyzer for producing a flow of hydrogen gas; a drying device configured to remove moisture from the flow of hydrogen gas; a compressor configured to receive the flow of hydrogen gas from the drying device; and a recirculation line connected to output of the compressor to recirculate at least a portion of the flow of hydrogen gas from the compressor to the drying device.

In Example 2, the subject matter of Example 1 optionally includes a valve located in the recirculation line.

In Example 3, the subject matter of Example 2 optionally includes a controller configured to operate the valve based on an operating state of the electrolyzer.

In Example 4, the subject matter of Example 3 optionally includes a first pressure sensor configured to sense pressure of hydrogen gas entering the compressor; and a second pressure sensor configured to sense pressure of hydrogen gas leaving the compressor.

In Example 5, the subject matter of any one or more of Examples 1-4 optionally include a cooler configured to cool the flow of hydrogen gas form the compressor before entering the recirculation line.

In Example 6, the subject matter of any one or more of Examples 1-5 optionally include wherein the drying device comprises a desiccant dryer including adsorption beds of a desiccant material that the hydrogen gas passes through.

In Example 7, the subject matter of any one or more of Examples 1-6 optionally include a hydrogen storage system configured to receive the flow of hydrogen gas from the compressor downstream of the recirculation line.

In Example 8, the subject matter of any one or more of Examples 1-7 optionally include wherein the compressor is configured to operate at a fixed volumetric flowrate.

Example 9 is a method of drying hydrogen in a hydrogen production facility, the method comprising: producing a flow of hydrogen gas with an electrolyzer; drying the flow of hydrogen gas with a drying device; compressing the flow of hydrogen gas from the drying device with a compressor; and recirculating at least a portion of the flow of hydrogen gas from the compressor to the drying device to maintain pressure distribution within the drying device.

In Example 10, the subject matter of Example 9 optionally includes modulating the portion of the flow of hydrogen gas from the compressor that flows to the drying device based on output of the electrolyzer.

In Example 11, the subject matter of Example 10 optionally includes operating the electrolyzer in a turndown mode such that volumetric flow from the electrolyzer is less than a capacity of the compressor; and recirculating sufficient flow of hydrogen gas from the compressor to the drying device to provide volumetric flow through the compressor at the capacity.

In Example 12, the subject matter of any one or more of Examples 10-11 optionally include stopping recirculation of the portion of the flow of hydrogen gas from the compressor when the electrolyzer is operating at full capacity.

In Example 13, the subject matter of any one or more of Examples 9-12 optionally include cooling the flow of hydrogen gas from the compressor before recirculating the portion of the flow of hydrogen gas from the compressor.

In Example 14, the subject matter of any one or more of Examples 9-13 optionally include wherein drying the flow of hydrogen gas with a drying device comprises passing the flow of hydrogen gas through a beaded adsorption bed.

In Example 15, the subject matter of any one or more of Examples 9-14 optionally include storing compressed hydrogen gas in a storage system after compressing the flow of hydrogen gas from the drying device.

In Example 16, the subject matter of any one or more of Examples 9-15 optionally include wherein compressing the flow of hydrogen gas from the drying device comprises compressing hydrogen gas at a fixed volumetric flow rate.

Example 17 is a controller for operating a hydrogen production facility, the controller comprising: a pressure sensor interface for receiving input signals from a compressor; a kickback valve interface for providing an output signal to a kickback valve that controls recirculation between output of the compressor an inlet of a hydrogen dryer; and memory having stored therein instructions for operating the kickback valve based on compressor suction pressures received at the pressure sensor interface.

In Example 18, the subject matter of Example 17 optionally includes wherein the instructions for operating the kickback valve comprise increasing the recirculation as hydrogen output of the electrolyzer decreases.

In Example 19, the subject matter of any one or more of Examples 17-18 optionally include a first pressure sensor configured to sense pressure of hydrogen gas at an inlet of the compressor; and a second pressure sensor configured to sense pressure of hydrogen gas at an outlet of the compressor.

In Example 20, the subject matter of any one or more of Examples 17-19 optionally include the kickback valve.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system for drying hydrogen in a hydrogen production facility, the system comprising:
   an electrolyzer for producing a flow of hydrogen gas;
   a drying device configured to remove moisture from the flow of hydrogen gas;
   a compressor configured to receive the flow of hydrogen gas from the drying device;
   a recirculation line connected to output of the compressor to recirculate at least a portion of the flow of hydrogen gas from the compressor to the drying device;
   a valve located in the recirculation line; and
   a controller configured to operate the valve based on an operating state of the electrolyzer.

2. The system of claim 1, further comprising:
   a first pressure sensor configured to sense pressure of hydrogen gas entering the compressor; and
   a second pressure sensor configured to sense pressure of hydrogen gas leaving the compressor.

3. The system of claim 1, further comprising:
   a cooler configured to cool the flow of hydrogen gas from form the compressor before entering the recirculation line; and
   a hydrogen storage system configured to receive the flow of hydrogen gas from the compressor downstream of the recirculation line.

4. A method of drying hydrogen in a hydrogen production facility, the method comprising:
   producing a flow of hydrogen gas with an electrolyzer;
   drying the flow of hydrogen gas with a drying device;
   compressing the flow of hydrogen gas from the drying device with a compressor; and
   recirculating at least a portion of the flow of hydrogen gas from the compressor to the drying device to maintain pressure distribution within the drying device.

5. The method of claim 4, further comprising modulating the portion of the flow of hydrogen gas from the compressor that flows to the drying device based on output of the electrolyzer.

6. The method of claim 5, further comprising:
   operating the electrolyzer in a turndown mode such that volumetric flow from the electrolyzer is less than a capacity of the compressor; and
   recirculating sufficient flow of hydrogen gas from the compressor to the drying device to provide volumetric flow through the compressor at the capacity.

7. The method of claim 5, further comprising stopping recirculation of the portion of the flow of hydrogen gas from the compressor when the electrolyzer is operating at full capacity.

8. The method of claim 4, further comprising:
   cooling the flow of hydrogen gas from the compressor before recirculating the portion of the flow of hydrogen gas from the compressor; and
   storing compressed hydrogen gas in a storage system after compressing the flow of hydrogen gas from the drying device.

9. A controller for operating a hydrogen production facility comprising an electrolyzer, the controller comprising:
   a pressure sensor interface for receiving input signals from a compressor configured to receive a hydrogen output from the electrolyzer;
   a kickback valve interface for providing an output signal to a kickback valve that controls recirculation between output of the compressor an inlet of a hydrogen dryer; and
   memory having stored therein instructions for:
      operating the kickback valve based on compressor suction pressures received at the pressure sensor interface;
      operating the electrolyzer to produce the hydrogen output; and
      operating a drying device that receives the hydrogen output from the electrolyzer.

10. The controller of claim 9, wherein the instructions for operating the kickback valve comprise increasing the recirculation as the hydrogen output of the electrolyzer decreases.

11. The controller of claim 9, further comprising:
    a first pressure sensor configured to sense pressure of hydrogen gas at an inlet of the compressor; and
    a second pressure sensor configured to sense pressure of hydrogen gas at an outlet of the compressor.

12. The controller of claim 9, further comprising the kickback valve.

13. The controller of claim 10, wherein the controller further comprises instructions for stopping recirculation of the hydrogen output from the compressor when the electrolyzer is operating at full capacity.

14. The controller of claim 9, wherein the instructions for operating the kickback valve comprise modulating the kickback valve.

15. The controller of claim 9, wherein the drying device comprises a beaded adsorption bed.

16. The controller of claim 9, wherein the controller further comprises instructions for controlling operation of a storage system to store hydrogen gas from the drying device.

17. The controller of claim 9, wherein the controller further comprises instructions for operating a cooling device to cool flow of the hydrogen output from the electrolyzer before entering the compressor.

18. The controller of claim 9, wherein the controller further comprises instructions for operating the compressor to compress the hydrogen output at a fixed volumetric flow rate.

19. The controller of claim 9, wherein the controller further comprises instructions for operating the electrolyzer in a turndown mode where volumetric flow from the electrolyzer is less than a capacity of the compressor.

20. A controller for operating a hydrogen production facility comprising an electrolyzer, the controller comprising:

a pressure sensor interface for receiving input signals from a compressor configured to receive a hydrogen output from the electrolyzer;

a kickback valve interface for providing an output signal to a kickback valve that controls recirculation between output of the compressor an inlet of a hydrogen dryer;

memory having stored therein instructions for:

operating the kickback valve based on compressor suction pressures received at the pressure sensor interface;

a first pressure sensor configured to sense pressure of hydrogen gas at an inlet of the compressor; and a second pressure sensor configured to sense pressure of hydrogen gas at an outlet of the compressor.

\* \* \* \* \*